(12) United States Patent
Fike

(10) Patent No.: US 9,926,098 B2
(45) Date of Patent: Mar. 27, 2018

(54) PAPERBOARD BLANKS HAVING A SHRINKABLE FILM ADHERED THERETO AND PAPERBOARD CONTAINER MADE THEREFROM

(71) Applicant: GPCP IP HOLDINGS LLC, Atlanta, GA (US)

(72) Inventor: Gregory M. Fike, Atlanta, GA (US)

(73) Assignee: GPCP IP HOLDINGS LLC, Atlanta, GA (US)

( * ) Notice: Subject to any disclaimer, the term of this patent is extended or adjusted under 35 U.S.C. 154(b) by 455 days.

(21) Appl. No.: 13/926,440

(22) Filed: Jun. 25, 2013

(65) Prior Publication Data

US 2013/0341387 A1    Dec. 26, 2013

Related U.S. Application Data

(60) Provisional application No. 61/664,067, filed on Jun. 25, 2012.

(51) Int. Cl.
*B65D 1/26* (2006.01)
*B65D 3/10* (2006.01)
(Continued)

(52) U.S. Cl.
CPC ............ *B65D 1/265* (2013.01); *B31B 50/262* (2017.08); *B32B 1/02* (2013.01); *B32B 27/10* (2013.01);
(Continued)

(58) Field of Classification Search
CPC . B65D 1/22; B65D 1/265; B65D 1/28; B65D 3/04; B65D 3/10; B65D 3/22; B65D 81/3823; B65D 81/3865; B65D 81/3869; B65D 81/3874; B32B 1/02; B32B 27/10; B32B 27/32; B32B 29/00; B32B 37/12; Y10T 428/1317; Y10T 428/1321; B31B 50/262
(Continued)

(56) References Cited

U.S. PATENT DOCUMENTS 593,316 A    11/1897 Woodman
1,157,008 A    10/1915 Lang
(Continued)

FOREIGN PATENT DOCUMENTS

JP    57-065158 A    4/1982
JP    06-219474 A    8/1994
(Continued)

OTHER PUBLICATIONS

International Search Report for PCT/US2006/025916 dated Mar. 11, 2006.
(Continued)

*Primary Examiner* — Walter B Aughenbaugh

(57) ABSTRACT

Blanks and paper products made therefrom are provided. In one aspect, the blank for forming a paper product can include a paperboard substrate and a film. At least a portion of the film can be secured to the paperboard substrate with an adhesive disposed between the paperboard substrate and the film. A peel strength of less than 330 g/2.54 cm at a temperature of 23° C. can be required to separate the film secured to the paperboard substrate with the adhesive.

25 Claims, 2 Drawing Sheets

(51) Int. Cl.

| | | |
|---|---|---|
| *B65D 3/22* | (2006.01) | |
| *B65D 1/22* | (2006.01) | |
| *B65D 3/04* | (2006.01) | |
| *B65D 1/28* | (2006.01) | |
| *B32B 29/00* | (2006.01) | |
| *B32B 1/02* | (2006.01) | |
| *B32B 27/32* | (2006.01) | |
| *B32B 27/10* | (2006.01) | |
| *B65D 81/38* | (2006.01) | |
| *B31B 50/26* | (2017.01) | |
| *B32B 37/12* | (2006.01) | |

(52) U.S. Cl.
CPC .............. *B32B 27/32* (2013.01); *B32B 29/00* (2013.01); *B32B 37/12* (2013.01); *B65D 1/22* (2013.01); *B65D 1/28* (2013.01); *B65D 3/04* (2013.01); *B65D 3/10* (2013.01); *B65D 3/22* (2013.01); *B65D 81/3823* (2013.01); *B65D 81/3865* (2013.01); *B65D 81/3869* (2013.01); *B65D 81/3874* (2013.01); *Y10T 428/1317* (2015.01); *Y10T 428/1321* (2015.01)

(58) Field of Classification Search
USPC .............................................. 428/34.6, 34.7
See application file for complete search history.

(56) References Cited

U.S. PATENT DOCUMENTS

| | | | |
|---|---|---|---|
| 1,407,688 A | 2/1922 | Banton | |
| 1,756,243 A | 4/1930 | Benson | |
| 1,944,042 A | 1/1934 | Thompson | |
| 2,266,828 A | 12/1941 | Sykes | |
| 2,563,352 A | 8/1951 | Morse | |
| 2,678,764 A | 5/1954 | Carlson | |
| 2,853,222 A | 9/1958 | Gallagher | |
| 2,961,849 A | 11/1960 | Hitchcock | |
| 3,082,900 A | 3/1963 | Goodman | |
| 3,134,307 A | 5/1964 | Loeser | |
| 3,203,611 A | 8/1965 | Anderson et al. | |
| 3,237,834 A | 3/1966 | Davis et al. | |
| 3,246,745 A | 4/1966 | Stoker, Jr. | |
| 3,354,021 A | 11/1967 | Royet | |
| 3,402,874 A | 9/1968 | Sternall | |
| 3,406,814 A | 10/1968 | Gulliver | |
| 3,627,166 A | 12/1971 | Walter | |
| 3,669,337 A | 6/1972 | Struble | |
| 3,737,093 A | 6/1973 | Amberg et al. | |
| 3,781,183 A | 12/1973 | Doll | |
| 3,854,583 A | 12/1974 | Amberg et al. | |
| 3,972,467 A * | 8/1976 | Whillock ................ B32B 27/00 426/126 | |
| 3,988,521 A | 10/1976 | Fumel et al. | |
| 3,995,740 A | 12/1976 | Amberg et al. | |
| 4,051,951 A | 10/1977 | Smith | |
| 4,087,003 A | 5/1978 | Adamek | |
| 4,194,039 A | 3/1980 | Mueller | |
| 4,197,948 A | 4/1980 | Amberg et al. | |
| 4,261,501 A | 4/1981 | Watkins et al. | |
| 4,332,635 A | 6/1982 | Holbrook et al. | |
| 4,359,160 A | 11/1982 | Myers et al. | |
| 4,383,422 A | 5/1983 | Gordon et al. | |
| 4,398,904 A | 8/1983 | Fagerberg | |
| 4,435,344 A | 3/1984 | Iioka | |
| 4,452,596 A | 6/1984 | Clauss et al. | |
| 4,459,793 A | 7/1984 | Zenger | |
| 4,486,366 A | 12/1984 | Reddy | |
| 4,514,354 A | 4/1985 | Schlesinger et al. | |
| 4,551,366 A | 11/1985 | Maruhashi et al. | |
| 4,679,724 A | 7/1987 | Inagaki | |
| 4,692,132 A | 9/1987 | Ikushima et al. | |
| 4,923,557 A | 5/1990 | Dickey | |
| 4,952,451 A | 8/1990 | Mueller | |
| 4,971,845 A | 11/1990 | Aaker et al. | |
| 4,982,872 A * | 1/1991 | Avery ..................... B65D 25/14 220/62.13 | |
| 4,985,300 A | 1/1991 | Huang | |
| 5,001,016 A | 3/1991 | Kondo et al. | |
| 5,063,005 A | 11/1991 | Doheny, Jr. | |
| 5,078,817 A * | 1/1992 | Takagaki ................ B29C 63/42 156/272.2 | |
| 5,092,485 A | 3/1992 | Lee | |
| 5,145,107 A | 9/1992 | Silver et al. | |
| 5,205,473 A | 4/1993 | Coffin, Sr. | |
| 5,217,307 A | 6/1993 | McClintock | |
| 5,279,872 A | 1/1994 | Ralph | |
| 5,460,323 A | 10/1995 | Titus | |
| 5,469,983 A | 11/1995 | Yawata | |
| 5,490,631 A | 2/1996 | Iioka et al. | |
| 5,691,049 A | 11/1997 | Morita et al. | |
| 5,700,689 A | 12/1997 | Wuster | |
| 5,707,751 A | 1/1998 | Garza et al. | |
| 5,725,916 A | 3/1998 | Ishii et al. | |
| 5,736,231 A | 4/1998 | Todt | |
| 5,766,709 A | 6/1998 | Geddes et al. | |
| 5,840,139 A | 11/1998 | Geddes et al. | |
| 5,851,610 A | 12/1998 | Ristey et al. | |
| 5,882,612 A | 3/1999 | Riley | |
| 5,952,068 A | 9/1999 | Neale et al. | |
| 5,954,217 A | 9/1999 | Brkovic et al. | |
| 5,971,259 A * | 10/1999 | Bacon ..................... B65D 15/06 220/619 | |
| 5,993,705 A | 11/1999 | Grischenko et al. | |
| 6,030,476 A | 2/2000 | Geddes et al. | |
| 6,085,970 A | 7/2000 | Sadlier | |
| 6,098,829 A | 8/2000 | McHenry et al. | |
| 6,129,653 A | 10/2000 | Fredericks et al. | |
| 6,139,665 A | 10/2000 | Schmelzer et al. | |
| 6,142,331 A | 11/2000 | Breining et al. | |
| 6,152,363 A | 11/2000 | Rule, Jr. | |
| 6,224,954 B1 | 5/2001 | Mitchell et al. | |
| 6,364,149 B1 | 4/2002 | Smith | |
| 6,536,657 B2 | 3/2003 | Van Handel | |
| 6,604,307 B1 * | 8/2003 | Cahill ..................... B65D 3/22 40/306 | |
| 6,723,446 B2 | 4/2004 | Seta et al. | |
| 6,729,534 B2 | 5/2004 | Van Handel | |
| 6,739,470 B2 | 5/2004 | Yawata | |
| 6,852,381 B2 | 2/2005 | Debraal et al. | |
| 6,872,462 B2 | 3/2005 | Roberts et al. | |
| 6,908,687 B2 | 6/2005 | Mendes et al. | |
| 7,281,650 B1 | 10/2007 | Milan | |
| 7,464,856 B2 | 12/2008 | Van Handel | |
| 7,464,857 B2 | 12/2008 | Van Handel | |
| 7,510,098 B2 | 3/2009 | Hartjes et al. | |
| 7,513,386 B2 | 4/2009 | Hartjes et al. | |
| 7,600,669 B2 | 10/2009 | Van Handel | |
| 7,614,993 B2 | 11/2009 | Van Handel | |
| 7,811,644 B2 | 10/2010 | DeBraal et al. | |
| 7,841,974 B2 | 11/2010 | Hartjes et al. | |
| 7,913,873 B2 | 3/2011 | Van Handel | |
| 7,938,313 B1 | 5/2011 | Van Handel | |
| 8,038,023 B2 * | 10/2011 | Moore ................ B65D 77/225 220/745 | |
| 8,286,824 B2 | 10/2012 | Ikeda et al. | |
| 2003/0015582 A1 | 1/2003 | Handel | |
| 2003/0021921 A1 | 1/2003 | Debraal et al. | |
| 2003/0121963 A1 | 7/2003 | Van Handel | |
| 2004/0170814 A1 | 9/2004 | Van Handel | |
| 2005/0184074 A1 | 8/2005 | Simmons et al. | |
| 2007/0000931 A1 * | 1/2007 | Hartjes .............. B65D 81/3869 220/592.2 | |
| 2007/0029332 A1 | 2/2007 | Hartjes et al. | |
| 2007/0114271 A1 | 5/2007 | Van Handel | |
| 2007/0240811 A1 | 10/2007 | Baggot et al. | |
| 2008/0093434 A1 | 4/2008 | Van Handel | |
| 2009/0170679 A1 | 7/2009 | Hartjes et al. | |
| 2009/0289073 A1 | 11/2009 | Moore et al. | |
| 2010/0224529 A1 | 9/2010 | Forloni | |
| 2010/0224637 A1 | 9/2010 | Ikeda et al. | |

(56) References Cited

U.S. PATENT DOCUMENTS

| | | |
|---|---|---|
| 2011/0031305 A1 | 2/2011 | Pounder et al. |
| 2012/0312869 A1 | 12/2012 | Fike et al. |
| 2016/0176143 A1 | 6/2016 | Knauf et al. |

FOREIGN PATENT DOCUMENTS

| | | |
|---|---|---|
| JP | 2000-177785 A | 6/2000 |
| JP | 2006044723 A | 2/2006 |
| JP | 2006160346 A | 6/2006 |
| JP | 2011116411 A | 6/2011 |
| JP | 2011116412 A | 6/2011 |
| WO | 2012/160682 A1 | 11/2012 |

OTHER PUBLICATIONS

Williams, Mark B. et al. "Investigation of Spatial Resolution and Efficiency Using Pinholes with Small Pinhole Angle". Nuclear Science Symposium Conference Record, 2002 IEEE. Nov. 10-16, 2002, p. 1760-1764 vol. 3.

Clysar LE Summary of Properties, Feb. 1, 2003, three pages, http://www.logismarket.com.mx/ip/safte-food-ingredients-pelicula-multicapa-imprimible-de-baja-energia-ficha-tecnica-clysar-le-435253.pdf.

Clysar LLG Summary of Properties, Apr. 7, 2011, three pages, XP055195983, http://www.clysar.com/pdf/Clysar_LLG_PDS.pdf.

International Search Report of PCT/US2015/067517, mailed by the International Searching Authority dated Apr. 29, 2016.

Written Opinion of PCT/US2015/067517, mailed by the International Searching Authority dated Apr. 29, 2016.

International Search Report of PCT/US2015/000448, mailed by the International Searching Authority dated Apr. 6, 2016.

Written Opinion of PCT/US2015/000448, mailed by the International Searching Authority dated Apr. 6, 2016.

Office Action received for Chinese counterpart application, CN App. No. 2013102549625, mailed by the State Intellectual Property Office of the People's Republic of China dated May 17, 2016.

\* cited by examiner

PAPERBOARD BLANKS HAVING A SHRINKABLE FILM ADHERED THERETO AND PAPERBOARD CONTAINER MADE THEREFROM

BACKGROUND

Field

Embodiments described generally relate to paperboard blanks for paper products. More particularly, such embodiments relate to paperboard blanks having a shrinkable film adhered thereto and to paperboard containers made from the paperboard blanks and methods for making and using same.

Description of the Related Art

Paperboard is used to make a wide variety of paper products, such as plates, bowls, and cups. Paper products can be insulated in a variety of ways to provide an insulated product, such as an insulated cup for hot or cold beverages. For example, the paper product can be insulated by forming an air gap within a sidewall of the container. The air gap, for example, can be located between a film that forms an inner surface of the sidewall and a paperboard substrate that forms an outer surface of the sidewall. The film can be a shrinkable film that can shrink, e.g., a heat shrinkable film, to form the gap between the film and the paperboard substrate as the film shrinks.

One problem encountered in making an insulated container, such as a cup, with a heat shrinkable film is that the presence of an adhesive used to secure the film to the paperboard substrate along an edge the sidewall that is to be formed into a brim can prevent the formation of a complete brim curl, especially along a portion of the brim that corresponds to a sidewall seam of the container. The uncurled portion(s) of the brim are conventionally referred to in the art as "flagger(s)" or "dog ears." The brim provides needed structural support to the container and allows lids to be secured thereto, so it is desirable to avoid the formation of flaggers.

There is a need, therefore, for improved containers insulated with shrinkable films and improved methods for securing shrinkable films to paperboard blanks.

SUMMARY

Blanks and paper products made therefrom are provided. In one aspect, the blank for forming a paper product can include a paperboard substrate and a film. At least a portion of the film can be secured to the paperboard substrate with an adhesive disposed between the paperboard substrate and the film. A peel strength of less than 330 g/2.54 cm at a temperature of 23° C. can be required to separate the film secured to the paperboard substrate with the adhesive.

In one aspect, a paperboard container can include a sidewall formed from a paperboard blank and a bottom panel secured to the sidewall. The sidewall can include an inner surface comprising a film, an outer surface comprising a paperboard substrate, and a brim formed by curling a first edge of the sidewall. The film can be secured to the paperboard substrate with an adhesive disposed therebetween and along a perimeter of the first edge of the sidewall. A peel strength of less than 330 g/2.54 cm at a temperature of 23° C. can be required to separate the film secured to the paperboard substrate with the adhesive.

In one aspect, a method for making a paperboard container can include applying an adhesive about a perimeter of a paperboard substrate and locating a film onto the paperboard substrate to produce a blank. The adhesive can secure the film to the paperboard substrate. A peel strength of less than 330 g/2.54 cm at a temperature of 23° C. can be required to separate the film secured to the paperboard substrate with the adhesive. The method can also include forming the blank to overlap two opposing edges of the blank to form a sidewall. The sidewall can include an inner surface comprising the film and an outer surface comprising the paperboard substrate and a first edge adapted to be curled to form a brim curl. The method can also include securing a bottom panel to the sidewall at or adjacent a second edge of the sidewall and curling the first edge of the sidewall to form the brim curl.

DETAILED DESCRIPTION

Figure 1:
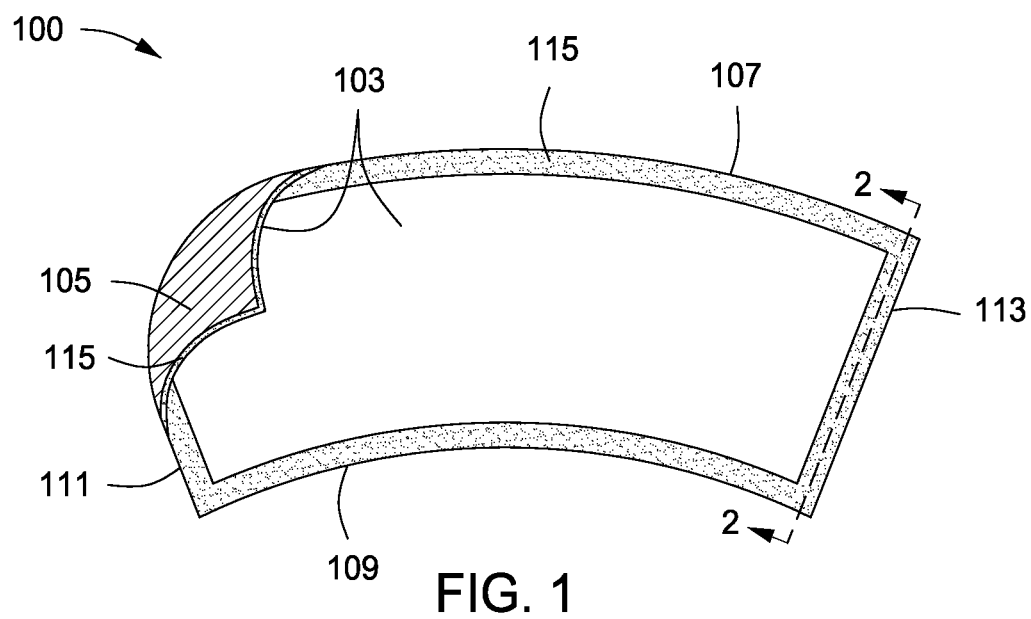
FIG. 1 depicts a schematic view of an illustrative blank, according to one or more embodiments described.
Figure 2:
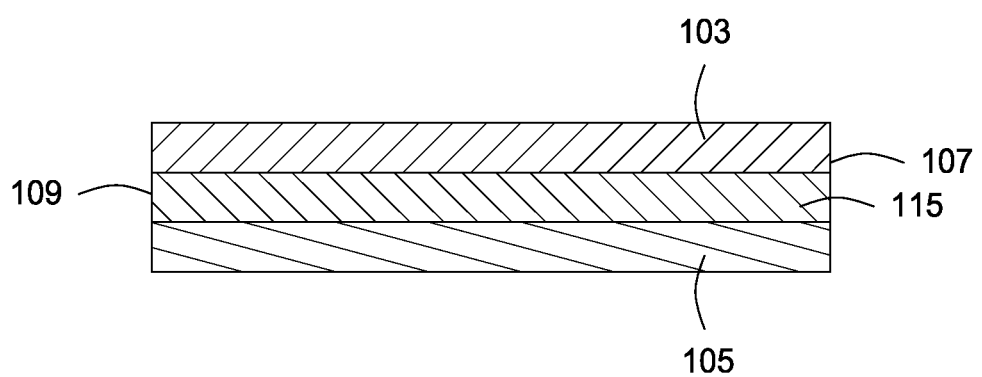
FIG. 2 depicts a schematic cross-sectional view of the blank depicted in FIG. 1 along line 2-2, according to one or more embodiments described.

FIG. 1 depicts a schematic view of an illustrative blank 100, according to one or more embodiments, and FIG. 2 depicts a schematic cross-sectional view along line 2-2 of the blank 100 depicted in FIG. 1. Referring to FIGS. 1 and 2, the blank 100 can include a first layer or film 103 and a second layer or substrate 105. The film 103 and the substrate 105 can be at least partially coupled, affixed, joined, fastened, attached, connected, or otherwise secured to one another with an adhesive 115. In one or more embodiments, the film 103 can be a shrinkable film and the substrate 105 can be a paperboard substrate. For simplicity and ease of description, embodiments provided herein will be further described with reference to a shrinkable film 103 and a paperboard substrate 105. When the substrate 105 is a paperboard substrate, the blank 100 can be formed into a paper product, such as a bowl, plate, container, tray, platter, deep dish container, fluted product, or cup. The terms "paper product," "paper containers," "paperboard products," and "paperboard containers" are intended to be interchangeable. For simplicity and ease of description, embodiments provided herein will be further described with reference to a paper cup.

The blank 100 can have a first or "top" edge 107, a second or "bottom" edge 109, a third or "left" edge 111, and a fourth or "right" edge 113. The particular shape of the blank 100 can depend, at least in part, on the particular container to be made from the blank 100. For example, the blank 100 depicted in FIG. 1 has arcuate first and second edges 107, 109 and straight third and fourth edges 111, 113 with the first and second edges 107, 109 opposed to one another and the third and fourth edges 111, 113 opposed to one another. The blank 100 can be formed into a paper cup having a frusto-conical outer sidewall. The third and fourth edges 111, 113 can be overlapped with one another to form a sidewall 305 having a seam 310, the first edge 107 can be curled to form a brim 315, and a bottom panel 320 (see FIGS. 3 and 4) can be secured to the sidewall at or adjacent to the second edge 109.

The adhesive 115 can be disposed between the shrinkable film 103 and the paperboard substrate 105 in any pattern or configuration. For example, the shrinkable film 103 can be secured to the paperboard substrate 105 about at least a portion of an area or region along a perimeter of the shrinkable film 103 and the paperboard substrate 105 with the adhesive 115. At least a portion of the interior or inner region between the shrinkable film 103 and the paperboard substrate 105 can be free or substantially free from the adhesive 115 such that the shrinkable film 103 can be free to move away from the paperboard substrate 105 as the shrinkable film 103 shrinks. For example, the adhesive 115 can be disposed between the shrinkable film 103 and the paperboard substrate 105 in a criss-cross or other overlapping pattern, as one or more dots or spots, in one or more lines at least partially running between a first and second set of opposed edges 107, 109, in one or more lines at least partially running between the third and fourth edges 111, 113, in one or more lines at least partially running diagonally between the first and second edges 107, 109 or the third and fourth edges 111, 114, any other pattern or configuration, or any combination of patterns or configurations that provides at least some area or region between the first and second layers 103, 105 free or substantially free from any adhesive 115.

The adhesive 115 can be applied onto the shrinkable film 103 and/or the paperboard substrate 105 by any suitable means known in the art. For example, spraying, brushing, flexographic printing of the adhesive 115 or any other suitable coating method can be employed. Suitable patterns or configurations that the adhesive 115 can be disposed between the shrinkable film 103 and the paperboard substrate 105 and methods for applying the adhesive 115 to the shrinkable film 103 and/or the paperboard substrate 105 can also include those discussed and described in U.S. Pat. Nos. 6,536,657; 6,729,534; 7,464,856; 7,614,993; 7,600,669; 7,464,857; 7,913,873; 7,938,313; 7,513,386; 7,510,098; and 7,841,974 and U.S. Patent Application Publication No. 2011/0031305.

As shown in FIG. 1, the adhesive 115 can be disposed between the shrinkable film 103 and the paperboard substrate 105 along the perimeter of the blank 100. As such, the adhesive 115 can be disposed between the first and second layers 103, 105 throughout at least a portion of the first edge 107 that can be curled to form the brim of the paper container (see, e.g., the brim 315 of the paper container depicted in FIGS. 3 and 4). The width of the adhesive line or "glue line" disposed between the shrinkable film 103 and the paperboard substrate 105 can be from a low of about 1 mm, about 2 mm, or about 3 mm to a high of about 4 mm, about 5 mm, about 8 mm, about 10 mm, about 15 mm, about 20 mm, about 25 mm, or about 30 mm.

The first layer or shrinkable film 103 can shrink when subjected to one or more predetermined triggers or conditions. For example, the shrinkable film 103 can be a heat shrinkable film, i.e., a film that shrinks when heated to a sufficient temperature. For example, the shrinkable film 103 can shrink when heated to a temperature of about 40° C. or more, about 50° C. or more, about 60° C. or more, about 70° C. or more, about 80° C. or more, about 90° C. or more, or about 100° C. or more. In at least one example, the film 103 can shrink when exposed to a hot liquid. In at least one other example, the film 103 can shrink when heated in an oven, by contact with a flow of heated gas, or other heating means. The film 103 can be shrunk by exposing the film to infrared light, microwaves, or a combination thereof.

As the shrinkable film 103 shrinks, a gap 404 (see FIG. 4 discussed and described in more detail below) can be formed between the non-secured portions of the shrinkable film 103 and the paperboard substrate 105. The gap 404 can provide an insulating property to a paperboard container, e.g., the paper cup 300 depicted in FIG. 3 and discussed and described in more detail below. For example, a heated liquid having a temperature from a low of about 70° C., about 75° C., or about 80° C. to a high of about 90° C., about 95° C., about 100° C., or about 110° C. or more can be added to the paper container to cause the shrinkable film 103 to shrink and form the insulating gap 404. The formation or presence of the gap 404 can provide an outer surface of the paper container insulated from the hot liquid therein. The temperature of the outer surface of the paper container can be less than about 70° C., less than about 65° C., less than about 60° C., less than about 55° C., less than about 50° C., less than about 45° C., less than about 40° C., or less than about 35° C., when a liquid at a temperature of 95° C. or 100° C. or more is contained within the paper container. As such, a person can hold the paper container containing the heated liquid therein about the outer surface of the container without being burned or otherwise experiencing an unsatisfactory level of discomfort due to the heated liquid within the paper container.

The shrink force exerted by the shrinkable film 103 during and after shrinking can pull or otherwise exert a force on the paperboard substrate 105. The adhesive 115 can have a tack or cohesive strength sufficient to maintain the shrinkable film 103 secured to the paperboard substrate 105. When the shrinkable film 103 shrinks, the shrinkable film 103 can have or exhibit a shrink force from a low of about 70 g/2.54 cm, about 80 g/2.54 cm, about 90 g/2.54 cm, about 100 g/2.54 cm, or about 110 g/2.54 cm to a high of about 130 g/2.54 cm, about 150 g/2.54 cm, about 175 g/2.54 cm, about 200 g/2.54 cm, about 225 g/2.54 cm, or about 250 g/2.54 cm. The shrink force of the shrinkable film 103 can depend, at least in part on the particular temperature the shrinkable film 103 is heated to and/or the thickness (gauge) of the shrinkable film 103. The shrink force of the shrinkable film 103 can be measured according to ASTM D2838. In one example, the shrinkable film 103, having a thickness of about 15.2 μm, can have a shrink force of about 120 g/2.54 cm, about 125 g/2.54 cm, about 130 g/2.54 cm, about 135 g/2.54 cm, or about 140 g/2.54 cm, as measured according to ASTM D2838. In another example, the shrinkable film 103, having a thickness of about 12.7 μm, can have a shrink force of about 80 g/2.54 cm, about 85 g/2.54 cm, about 90 g/2.54 cm, about 95 g/2.54 cm, or about 100 g/2.54 cm, at a temperature of 100° C., as measured according to ASTM D2838. In yet another example, the shrinkable film 103, having a thickness of about 11.4 nm, can have a shrink force of about 75 g/2.54 cm, about 80 g/2.54 cm, about 85 g/2.54 cm, about 90 g/2.54 cm, or about 95 g/2.54 cm, at a temperature of 100° C., as measured according to ASTM D2838.

The adhesive 115 can be a single or one part adhesive or glue. As used herein, the terms "single part" and "one part," when used in conjunction with "adhesive" or "glue," refer to an adhesive or an adhesive system that does not require the addition of a hardener, catalyst, accelerant, or other cure component or agent required to make the adhesive curable. Said another way, the adhesive 115 can include two or more different components, but the adhesive can be of a type that does not require adding a second component to the adhesive to form a curable adhesive. As such, the adhesive 115 can be storage stable for weeks, months, or even years and upon application of the adhesive 115 to the first or second layer, the adhesive 115 can be cured without the need for a hardener, catalyst, accelerator, or other cure agent.

The adhesive 115 can be or include a polyethylene vinyl acetate resin. The adhesive 115 can include one or more additives. Illustrative additives can include, but are not limited to, one or more tackifiers. Suitable tackifiers can include, but are not limited to, ethyl p-toluene sulfonamide. The amount of the additive, e.g., the tackifier, if present, can range from a low of about 1 wt %, about 3 wt %, or about 5 wt % to a high of about 8 wt %, about 10 wt %, about 12 wt %, or about 15 wt %, based on the total weight of the adhesive.

The adhesive 115 can have a storage modulus (elasticity) of about 1 MPa or more, about 1.3 MPa or more, about 1.5 MPa or more, about 1.7 MPa or more, about 2 MPa or more, about 2.5 MPa or more, about 3 MPa or more, about 3.5 MPa or more, about 4 MPa or more, about 4.5 MPa or more, about 5 MPa or more, about 5.5 MPa or more, about 6 MPa or more, about 6.5 MPa or more, about 7 MPa or more, about 7.3 MPa or more, or about 7.5 MPa or more at a temperature of 40° C. and a measurement frequency of 1 Hz. For example, the adhesive 115 can have a storage modulus from a low of about 1.8 MPa, about 2.4 MPa, about 2.8 MPa, about 3.2 MPa, or about 3.6 MPa to a high of about 4 MPa, about 4.5 MPa, about 4.9 MPa, about 5.6 MPa, about 6.6 MPa, about 7.1 MPa, or about 7.5 MPa at a temperature of 40° C. and a measurement frequency of 1 Hz, with suitable ranges including the combination of any two storage modulus values. In another example, the adhesive 115 can have a storage modulus of about 3.5 MPa to about 4.5 MPa, about 3.7 MPa to about 4.2 MPa, about 7 MPa to about 8 MPa, or about 7.2 MPa to about 7.8 MPa at a temperature of 40° C. and a measurement frequency of 1 Hz. At a temperature of 40° C. and a measurement frequency of 3 Hz, the adhesive 115 can have a storage modulus of about 1 MPa or more, about 1.3 MPa or more, about 1.5 MPa or more, about 1.7 MPa or more, about 2 MPa or more, about 2.5 MPa or more, about 3 MPa or more, about 3.5 MPa or more, about 4 MPa or more, about 4.5 MPa or more, about 5 MPa or more. For example, the adhesive 115 can have a storage modulus from a low of about 1.8 MPa, about 2.4 MPa, about 2.8 MPa, about 3.2 MPa, or about 3.6 MPa to a high of about 4 MPa, about 4.3 MPa, about 4.5 MPa, about 4.7 MPa, about 4.9 MPa, about 5 MPa, or about 5.3 MPa at a temperature of 40° C. and a measurement frequency of 3 Hz, with suitable ranges including the combination of any two storage modulus values. In another example, the adhesive 115 can have a storage modulus of about 4.5 MPa to about 5.5 MPa, about 4.2 MPa to about 5.2 MPa, about 4.6 MPa to about 5 MPa, or about 4.7 MPa to about 5 MPa at a temperature of 40° C. and a measurement frequency of 3 Hz.

The adhesive 115 can have a storage modulus of about 0.17 MPa or more, about 0.18 MPa or more, about 0.19 MPa or more, about 0.2 MPa or more, about 0.23 MPa or more, about 0.25 MPa or more, about 0.27 MPa or more, about 0.3 MPa or more, about 0.35 MPa or more, about 0.4 MPa or more, about 0.45 MPa or more, or about 0.5 MPa or more at a temperature of 100° C. and a measurement frequency of 1 Hz. For example, the adhesive 115 can have a storage modulus from a low of about 0.2 MPa, about 0.25 MPa, about 0.3 MPa, about 0.32 MPa, or about 0.34 MPa to a high of about 0.43 MPa, about 0.45 MPa, about 0.48 MPa, about 0.5 MPa, about 0.53 MPa, about 0.55 MPa, about 0.6 MPa, or about 0.65 MPa at a temperature of 100° C. and a measurement frequency of 1 Hz, with suitable ranges including the combination of any two storage modulus values. At a temperature of 100° C. and a measurement frequency of 3 Hz, the adhesive 115 can have a storage modulus of about 0.17 MPa or more, about 0.18 MPa or more, about 0.19 MPa or more, about 0.2 MPa or more, about 0.23 MPa or more, about 0.25 MPa or more, about 0.27 MPa or more, about 0.3 MPa or more, about 0.35 MPa or more, about 0.4 MPa or more, about 0.45 MPa or more, or about 0.5 MPa or more. For example, the adhesive 115 can have a storage modulus from a low of about 0.2 MPa, about 0.25 MPa, about 0.3 MPa, about 0.32 MPa, or about 0.34 MPa to a high of about 0.43 MPa, about 0.45 MPa, about 0.48 MPa, about 0.5 MPa, about 0.53 MPa, about 0.55 MPa, or about 0.6 MPa at a temperature of 100° C. and a measurement frequency of 3 Hz, with suitable ranges including the combination of any two storage modulus values.

The adhesive 115 can have a loss modulus of about 0.2 MPa or more, about 0.3 MPa or more, about 0.4 MPa or more, about 0.5 MPa or more, about 0.55 MPa or more, about 0.6 MPa or more, about 0.65 MPa or more, about 0.7 MPa or more, about 0.75 MPa or more, about 0.8 MPa or more, about 0.85 MPa or more, about 0.9 MPa or more, about 0.95 MPa or more, about 1 MPa or more, or about 1.05 MPa or more at a temperature of 40° C. and a measurement frequency of 1 Hz. For example, the adhesive 115 can have a loss modulus from a low of about 0.5 MPa, about 0.6 MPa, about 0.65 MPa, about 0.7 MPa, or about 0.75 MPa to a high of about 0.85 MPa, about 0.9 MPa, about 0.95 MPa, about 1 MPa, about 1.05 MPa, about 1.1 MPa, or about 1.2 MPa at a temperature of 40° C. and a measurement frequency of 1 Hz, with suitable ranges including the combination of any two loss modulus values. At a temperature of 40° C. and a measurement frequency of 3 Hz, the adhesive 115 can have a loss modulus of about 0.2 MPa or more, about 0.3 MPa or more, about 0.4 MPa or more, about 0.5 MPa or more, about 0.6 MPa or more, about 0.7 MPa or more, about 0.8 MPa or more, about 0.85 MPa or more, about 0.9 MPa or more, about 0.95 MPa or more, about 1 MPa or more, or about 1.05 MPa or more. For example, the adhesive 115 can have a loss modulus from a low of about 0.5 MPa, about 0.6 MPa, about 0.65 MPa, about 0.7 MPa, or about 0.75 MPa to a high of about 0.85 MPa, about 0.9 MPa, about 0.95 MPa, about 1 MPa, about 1.05 MPa, about 1.1 MPa, or about 1.2 MPa at a temperature of 40° C. and a measurement frequency of 3 Hz, with suitable ranges including the combination of any two loss modulus values.

The adhesive 115 can have a loss modulus of about 0.05 MPa or more, about 0.07 MPa or more, about 0.09 MPa or more, about 0.1 MPa or more, about 0.13 MPa or more, about 0.15 MPa or more, about 0.17 MPa or more, about 0.2 MPa or more, about 0.23 MPa or more, about 0.25 MPa or more, about 0.27 MPa or more, or about 0.3 MPa or more at a temperature of 100° C. and a measurement frequency of 1 Hz. For example, the adhesive 115 can have a loss modulus from a low of about 0.06 MPa, about 0.08 MPa, about 0.1 MPa, about 0.13 MPa, or about 0.15 MPa to a high of about 0.18 MPa, about 0.2 MPa, about 0.25 MPa, about 0.3 MPa, about 0.33 MPa, about 0.35 MPa, or about 0.37 MPa at a temperature of 100° C. and a measurement frequency of 1 Hz, with suitable ranges including the combination of any two loss modulus values. At a temperature of 100° C. and a measurement frequency of 3 he adhesive 115 can have a loss modulus of about 0.05 MPa or more, about 0.07 MPa or more, about 0.09 MPa or more, about 0.1 MPa or more, about 0.13 MPa or more, about 0.15 MPa or more, about 0.17 MPa or more, about 0.2 MPa or more, about 0.23 MPa or more, about 0.25 MPa or more, about 0.27 MPa or more, or about 0.3 MPa or more at a temperature of 100° C. and a measurement frequency of 3 Hz. For example, the adhesive 115 can have a loss modulus from a low of about 0.06 MPa, about 0.08 MPa, about 0.1 MPa, about 0.13 MPa, or about 0.15 MPa to a high of about 0.18 MPa, about 0.2 MPa, about 0.23 MPa, about 0.25 MPa, about 0.27 MPa, about 0.3 MPa, or about 0.32 MPa at a temperature of 100° C. and a measurement frequency of 3 Hz, with suitable ranges including the combination of any two loss modulus values.

The storage modulus (elasticity) and the loss modulus (velocity) of the adhesive 115 can be determined by a dynamic mechanical analysis (DMA). The storage modulus and the loss modulus can be measured with a TA Instruments DMA Q800. The DMA test can include shearing two equal size pieces of the same adhesive in the form of a disc or film having a diameter of about 10 mm and a thickness of about 3 mm to about 4 mm. One disc can be sheared between a fixed plate (storage modulus) and one disc can be sheared between a movable plate (loss modulus). The DMA conditions can be conducted at a temperature from about 35° C. to about 120° C. with a heating rate of about 5° C./min, an amplitude of 10 µm, and a frequency of 1 Hz or 3 Hz.

Commercially available adhesives suitable for use as the adhesive 115 discussed and described above and elsewhere herein can include, but are not limited to, Velocity® 33-9192 and Velocity® 33-9080, both available from Henkel Corporation. It is believed that the Velocity® 33-9192 and Velocity® 33-9080 adhesives are both polyethylene vinyl acetate resins, with the Velocity® 33-9192 including the addition of ethyl p-toluene sulfonamide (tackifier) in an amount of about 5 wt % to about 10 wt %, based on the total weight of the adhesive.

The peel strength required to separate the shrinkable film 103 from the paperboard substrate 105 when secured thereto with the adhesive 115 can be less than about 340 g/2.54 cm, less than about 330 g/2.54 cm, less than about 320 g/2.54 cm, less than about 310 g/2.54 cm, less than about 300 g/2.54 cm, less than about 290 g/2.54 cm, less than about 280 g/2.54 cm, less than about 270 g/2.54 cm, less than about 260 g/2.54 cm, less than about 250 g/2.54 cm, less than about 240 g/2.54 cm, less than about 230 g/2.54 cm, or less than about 220 g/2.54 cm at a temperature of about 23° C. For example, the peel strength required to separate the shrinkable film 103 from the paperboard substrate 105 when secured thereto with the adhesive 115 can be from a low of about 200 g/2.54 cm, about 210 g/2.54 cm, about 215 g/2.54 cm, about 220 g/2.54 cm, about 225 g/2.54 cm, about 230 g/2.54 cm, or about 235 g/2.54 cm to a high of about 245 g/2.54 cm, about 250 g/2.54 cm, about 255 g/2.54 cm, about 260 g/2.54 cm, about 265 g/2.54 cm, about 270 g/2.54 cm, about 275 g/2.54 cm, about 280 g/2.54 cm, or about 285 g/2.54 cm at a temperature of about 23° C., with suitable ranges including the combination of any two peel strength values. In another example, the peel strength required to separate the shrinkable film 103 from the paperboard substrate 105 when secured thereto with the adhesive 115 can be from about 200 g/2.54 cm to about 300 g/2.54 cm, about 210 g/2.54 cm to about 280 g/2.54 cm, about 210 g/2.54 cm to about 230 g/2.54 cm, about 240 g/2.54 cm to about 270 g/2.54 cm, or about 215 g/2.54 cm to about 275 g/2.54 cm at a temperature of about 23° C.

The peel strength can be measured according to the following procedure. The shrinkable film 103 and the paperboard substrate 105 can be secured to one another with the adhesive 115 and a 1 inch wide sample can be cut therefrom. The shrinkable film 103 and the paperboard substrate 105 at the end of a sample (not adhered to one another with the adhesive or separated from one another if adhered) can be secured in opposing clamps and pulled apart form one another at an angle of 180°, at a rate of 1 inch per minute, while at a temperature of 23° C. An Instron tensile tester Model 5943 can be used to measure the force with a frequency of 25 data points per second throughout the peel. The average value of the force measured is the peel strength required to separate the shrinkable film 103 from the paperboard substrate 105 when secured thereto with the adhesive 115.

The adhesive 115 discussed and described herein can be used to form paperboard blanks suitable for making a paperboard product in which a brim can be more completely curled as compared to a comparative paperboard product that is the same except a comparative adhesive is used to form the paperboard blanks. More particularly, the comparative paperboard blank does not form a complete brim curl, while the paperboard blank made with the adhesive 115 that requires less force (lower peel strength) to separate the film from the paperboard substrate than the comparative paperboard blank, can form a complete brim curl. The comparative adhesive used to make the comparative paperboard blank is a poly ethyl acrylate resin that has a storage modulus of about 0.5 MPa at a temperature of 40° C. and a measurement frequency of 1 Hz and a loss modulus of about 0.16 MPa at a temperature of 40° C. and a measurement frequency of 1 Hz. The comparative adhesive secures the shrinkable film to the paperboard substrate sufficiently that a peel strength required to separate the shrinkable film from the paperboard substrate is greater than 340 g/2.54 cm. Surprisingly and unexpectedly paperboard blanks made with the adhesive 115 that secure the shrinkable film to the paperboard substrate such that separating the two requires a peel strength of less than 340 g/2.54 cm can produce a paper product in which the brim can be completely curled, while the brim of a paper product made from the comparative adhesive having a peel strength of 340 g/2.54 cm or more does not completely curl. For example, paperboard blanks made with the adhesive 115 and having a peel strength required to separate the film 103 from the paperboard substrate 105 of less than 300 g/2.54 cm, less than 290 g/2.54 cm, and less than 280 g/2.54 cm can be used to make a paper cup having a brim that can completely curl.

In the context of a paperboard container, the paperboard container can be made by forming the blank 100 to overlap the two opposing edges 111 and 113 of the blank 100 to form a sidewall 305 (see, e.g., FIG. 3) having a seam 310 where the opposing edges 111, 113 contact one another. The opposing edges 111, 113 can be secured to one another by heat sealing the two together. A brim or "brim curl" can be formed by rolling, urging, or curling the first edge 107 of the paperboard blank 100, which becomes an edge or "top" edge of the sidewall 305. More particularly, to form the brim curl, the edge 107 of the paperboard blank 100 can be rolled, urged, or curled such that the outer or distal end of the edge turns and contacts the paperboard substrate 105 and maintains this position. For an incompletely formed brim curl, in contrast, the edge may contact the paperboard substrate 105 briefly when an attempt to form the brim curl is made, but the outer or distal end of the edge does not maintain this position. The brim curl formed on paperboard containers made with the comparative adhesive does not form completely, especially along the portion where the seam 310 is located. Accordingly, the brim of paper containers made with the comparative adhesive form the "flaggers" or "dog ears," especially along the brim where the seam is present.

The brim curl can traverse the perimeter or circumference or only a portion thereof of a first or "top" edge of the paperboard product. The amount of the brim that uncurls after formation of the brim and at least partial curing of the adhesive 115 disposed between the shrinkable film and the paperboard substrate can be less than about 5%, less than about 4%, less than about 3%, less than about 2%, less than about 1%, less than about 0.5%, less than about 0.1%, less than about 0.05%, or less than about 0.01% of the length of the brim or brim curl. In at least one specific embodiment, the amount of the brim that uncurls after formation of the brim can be essentially none. Said another way, a paperboard container can be made from the paperboard blank 100 having the shrinkable film 103 secured to the paperboard substrate 105 with the adhesive 115 that does not exhibit or essentially does not exhibit brim uncurling or "flaggers" or "dog ears," when the peel strength required to separate the shrinkable film 103 from the paperboard substrate 105 can be less than 330 g/2.54 cm, or less than 315 g/2.54 cm, or less than 300 g/2.54 cm, or less than 290 g/2.54 cm at a temperature of 23° C.

The shrinkable film 103 can be uniaxially or biaxially oriented. In at least one specific example, the shrinkable film 103 can be a biaxially oriented, heat shrinkable polymeric film. In at least one specific example, the shrinkable film 103 can be a uniaxially oriented, heat shrinkable polymeric film. The shrinkable film 103 can be a mono-layer film or a multi-layer film. Orientation in the direction of extrusion is known as machine direction (MD) orientation. Orientation perpendicular to the direction of extrusion is known as transverse direction (TD) orientation. Orientation can be accomplished by stretching or pulling a film first in the MD followed by TD orientation. Blown films or cast films can also be oriented by a tenter-frame orientation subsequent to the film extrusion process, again in one or both directions. Orientation can be sequential or simultaneous, depending upon the desired film features. Typical commercial orientation processes are BOPP (biaxially oriented polypropylene) tenter process, blown film, and LISIM technology. Commercially available films that can be used as the shrinkable film 103 can include, but are not limited to, Clysar® HPG (HP Gold), Clysar® LLGT, Clysar® VEZT, Clysar® LLG, Clysar® ABL, available from Bemis Clysar, Oshkosh, Wis. In one or more embodiments, the first layer or film 103 can be a non-shrinkable film. A non-shrinkable film can be made from one or more polymeric materials that do not shrink when heated to a temperature up to about 100° C. Illustrative materials that can be used to make a non-shrinkable film can include, but are not limited to, one or more polyethylenes, one or more polypropylenes, one or more polyesters, and the like.

The total thickness of the resulting monolayer and/or multilayer shrinkable film 103 can vary. A total film thickness of about 5 μm to about 50 μm or about 10 μm to about 30 μm can be suitable for most paperboard containers. The shrinkable film 103 can have any desired thickness. Preferably the thickness of the shrinkable film 103 can be sufficient to reduce or prevent the shrinkable film 103 from breaking, tearing, ripping, or otherwise forming holes therethrough. The shrinkable film 103 can have a thickness from a low of about 5 μm, about 10 μm, or about 15 μm to a high of about 20 μm, about 25 μm, about 30 μm, or about 35 μm. For example, the shrinkable film 103 can have a thickness of about 11.43 μm, about 12.7 μm, about 15.24 μm, or about 19.05 μm.

A surface area of the shrinkable film 103 can shrink or reduce from an original or starting surface area to a second or final surface area in an amount of about 5%, about 10%, about 15%, about 20%, about 25%, about 30%, about 35%, about 40%, about 45%, about 50%, about 55%, or about 60% based on the original or starting surface area. For example, the surface area of the shrinkable film 103 can shrink or reduce from an original or starting surface area to a second or final surface area in an amount of about 10% to about 30%, about 15% to about 30%, about 8% to about 20%, about 15% to about 35%, about 12% to about 33%, about 25% to about 35%, or about 10% to about 40%. In another example, a heat shrink film having a surface area of about 100 cm² can be reduced to about 95 cm², about 90 cm², about 85 cm², about 80 cm², about 75 cm², about 70 cm², about 65 cm², about 60 cm², about 55 cm², about 50 cm², about 45 cm², or about 40 cm² when subjected to a temperature of about 40° C. to about 100° C. In at least one specific example, the surface area of the shrinkable film 103 can shrink in an amount of about 40%, about 45%, about 50%, about 55%, or about 60% when heated to a temperature of 102° C. for a time of 10 minutes. The shrinkage of the shrinkable film 103 can be measured according to ASTM D1204.

The second layer 105 can be or include any paperboard material capable of forming a desired paper container. It should be noted that the second layer 105 can be or include non-paperboard or non-paper based materials such as one or more polymers, e.g., polyolefins, and/or metals, e.g., aluminum. Paperboard materials suitable for use as the second layer or substrate 105 can have a basis weight of about 163 grams to about 550 grams per square meter (about 100 pounds to about 339 pounds per 3,000 square feet) of paperboard substrate or about 195 grams to about 500 grams per square meter (about 120 pounds to about 306 pounds per 3,000 ft²) of paperboard substrate. The basis weight of the paperboard material can be from a low of about 163 grams, about 195 grams, about 210 grams, about 225 grams, about 250 grams, or about 275 grams to a high of about 325 grams, about 350 grams, about 375 grams, about 400 grams, about 425 grams, or about 450 grams per square meter of paperboard substrate. The paperboard material can have a thickness from a low of about 175 μm, about 200 μm, about 225 μm, or about 250 μm to a high of about 350 μm, about 400 μm, about 450 μm, about 500 μm, about 550 μm, or about 600 μm. In another example, the paperboard material can have a thickness of about 185 μm to about 475 μm, about 215 μm to about 425 μm, or about 235 μm to about 375 μm.

If the second layer 105 is or includes paperboard, the paperboard can be coated or uncoated with one or more additional materials. For example, the paperboard can be uncoated, e.g., free from wax, clay, polyethylene, and other coating material. In another example, a suitable paperboard can be or include paperboard coated with one or more waxes, one or more clays, and/or one or more polyolefins on one or both sides. A paperboard can be coated with polyethylene, for example, using any suitable process. In one example, a polyethylene coating can be applied to the paperboard via an extrusion process. Polyethylene and/or other polymeric materials can be coated onto the paperboard to provide liquid resistance properties and/or serve as a heat sealable coating. Suitable polymeric materials that can be used to coat the paperboard can include, but are not limited to, polyethylene, polypropylene, polyester, or any combination thereof. If the paperboard is coated with a material, e.g., wax or polymeric material, the coating can have a thickness from a low of about 0.002 mm, about 0.005 mm, about 0.01 mm, about 0.03 mm, about 0.05 mm, about 0.07 mm, or about 0.1 mm to a high of about 0.15 mm, about 0.17 mm, about 0.2 mm, about 0.25 mm, about 0.3 mm, or about 0.35 mm.

Commercially available paperboard material that can be used as the second layer 105 can include, but is not limited to, solid bleached sulfate (SBS) cupstock, bleached virgin board, unbleached virgin board, recycled bleached board, recycled unbleached board, or any combination thereof. For example, SBS cupstock available from Georgia-Pacific Corporation can be used as the second layer 105.

In one or more embodiments, at least a portion of the surface(s) of the shrinkable film 103 and/or the second layer 105, e.g., a paperboard substrate, can be oxidized via corona and/or flame discharge treatments. Oxidizing the surface of the shrinkable film 103 and/or the second layer 105 can increase or raise the surface energy of the treated surface. The shrinkable film 103 can have a surface energy, treated or untreated, greater than about 30 dyne/cm, greater than about 35 dyne/cm, greater than about 38 dyne/cm, greater than about 40 dyne/cm, greater than about 42 dyne/cm, greater than about 44 dyne/cm, or greater than about 46 dyne/cm. In at least one embodiment, the surface of the shrinkable film 103 that contacts the adhesive 115, the surface of the second layer 105 that contacts the adhesive 115, and/or the surface of the second layer 105 that may be coated with ink can be subjected to corona and/or flame treatment.

The method for making the blank 100 can include applying the adhesive 115 to the shrinkable film 103 and/or the second layer 105. The shrinkable film 103 and the second layer 105 can be contacted with one another such that the adhesive 115 can at least partially secure the shrinkable film 103 to the second layer 105. The amount of adhesive 115 applied to the shrinkable film 103 and/or the second layer 105 can range from a low of about 0.1 lb, about 0.3 lb, about 0.5 lb, about 1 lb, about 2 lb, or about 3 lb to a high of about 5 lb, about 6 lb, about 7 lb, about 8 lb, about 9 lb, about 10 lb, about 11 lb, or about 12 lb of adhesive 115 per 3,000 square feet of the shrinkable film 103 or second layer 105. For example, the amount of the adhesive 115 applied to the second layer 105 can be about 0.3 lb to about 3 lb of adhesive 115 per 3,000 square feet of the shrinkable film 103 or second layer 105, about 2.5 lb to about 6 lb of adhesive 115 per 3,000 square feet of the shrinkable film 103 or second layer 105, about 4 lb to about 8.5 lb of adhesive 115 per 3,000 square feet of the shrinkable film 103 or second layer 105 or about 1.5 lb to about 6.5 lb of adhesive 115 per 3,000 square feet of the shrinkable film 103 or second layer 105. Multiple coatings of the adhesive 115 can be applied to achieve the aforementioned amounts. The adhesive 115 can be applied by any suitable means known in the art. For example, spraying, brushing, flexographic printing of the adhesive 115 or any other suitable coating method can be employed.

The blank 100 can be formed as part of a paperboard roll (not shown) that includes a plurality of blanks 100 formed therein. The blank 100 can be cut from the paperboard roll. A paperboard roll can be formed that includes any suitable number of paperboard blanks formed therein.

Figure 3:
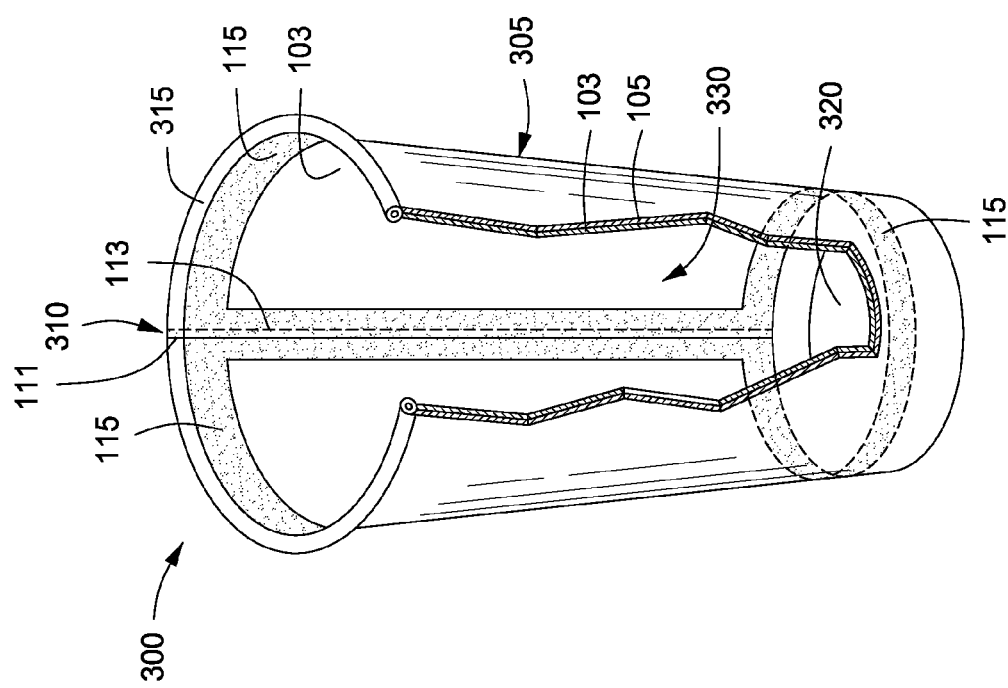
FIG. 3 depicts a partial cut away, perspective view of an illustrative paper cup, according to one or more embodiments described.

As noted above, FIG. 3 depicts a partial cut away perspective view of the paper cup 300, according to one or more embodiments. The paper cup 300 can include a sidewall 305, a bottom panel or cup bottom 320, and the brim curl 315. The sidewall 305 can include the shrinkable film 103 and the paperboard substrate 105. The shrinkable film 103 can form or provide at least a portion of the inner surface of the sidewall 305 and the paperboard substrate 105 can form or provide at least a portion of the outer surface of the sidewall 305. As shown in FIG. 3, the shrinkable film 103 has not been shrunk to provide a shrunk film 103.

The sidewall 305 can be formed by rolling or otherwise placing the third and fourth edges 111, 113 of the blank 100 depicted in FIG. 1 in contact with one another to form the seam 310. For example, the blank 100 can be formed around a mandrel to form the seam 310. As such, the first edge 107 can form a first or "top" edge of the sidewall 305 and the second edge 109 can form a second or "bottom" edge of the sidewall 305. If the paperboard substrate 105 is coated with a polymeric material, e.g., polyethylene, the sidewall 305 can be heat sealed to provide a sealed seam 310. The seam 310 can also be sealed with one or more adhesives, e.g., the adhesive 115 or any other adhesive suitable for sealing the third and fourth edges 111, 113 to one another. As shown, the adhesive 115 can be used to secure the shrinkable film 103 to the paperboard substrate 105 along the third and fourth edges 111, 113 and, as such, can be present within the seam 310.

The brim curl 315 can be formed by rolling, folding, curling, or otherwise urging the first or top edge of the sidewall 305 upon itself. The brim curl 315 can be formed by urging the first edge of the sidewall 305 toward the paperboard substrate 105.

The second edge 109 of the blank 100 can form a second or "bottom" edge of the sidewall 305. The bottom panel 320 of the paper cup 300 can be disposed on or otherwise secured to the sidewall 305, e.g., proximate or adjacent the second edge of the sidewall, such that the sidewall 305 and the bottom panel 320 define a container volume 330. The bottom panel 320 can be coupled, affixed, joined, fastened, attached, connected, or otherwise secured to the sidewall 305 with the adhesive 115, another adhesive, and/or via other means such as by heat sealing. For example, similar to the paperboard substrate 105, the bottom panel 320 can be coated in a polymeric material capable of forming a seal between the polymeric material, if present, on the paperboard substrate.

The outer and/or inner surface of the sidewall 305 can include one or more printed patterns that can be applied to the paperboard substrate 105. "Printed patterns" and like terminology can refer to ink-printed patterns for aesthetics. Such features, however, can have a functional aspect such as indicating a fill line.

The paper cup 300 can have any suitable container volume 330. For example, the container volume 330 can range from a low of about 20 mL, about 40 mL, about 60 mL, about 80 mL, or about 100 mL to a high of about 120 mL, about 200 mL, about 300 mL, about 400 mL, about 500 mL, about 750 mL, about 1,000 mL, about 1,300 mL, or about 1,500 mL. For example, the container volume 595 can be from about 150 mL to about 500 mL, about 450 mL to about 1,000 mL, about 400 mL to about 900 mL, or about 800 mL to about 1,300 mL.

The time required for the shrinkable film 103 to shrink or transition between an initial state to a shrunk state can vary based on one or more factors such as the area of the shrinkable film, the thickness of the shrinkable film, the temperature of the hot fluid placed into contact or otherwise in a heat exchanging relationship with the shrinkable film 103, an amount or flow rate of air or other fluid into a volume or space or "gap" formed between the shrinkable film 103 and the second layer 105 as the shrinkable film 103 shrinks, or combinations of these and/or other factors. In the initial state, the shrinkable film 103 can be free from any prior shrinking or the film 103 can be partially or pre-shrunk, but not fully shrunk. The amount of time required for the shrinkable film 103 to go from the non-shrunk state to the shrunk state can be about 10 seconds or less, about 9 seconds or less, about 8 seconds or less, about 7 seconds or less, about 6 seconds or less, about 5 seconds or less, about 4 seconds or less, about 3 seconds or less, about 2 seconds or less, about 1 second or less, or about 0.5 seconds or less per 100 mL of container volume 330, when a fluid at a temperature of about 70° C. to about 100° C. contacts the shrinkable film 103. For example, the shrinkable film 103 can transition from the non-shrunk state to the shrunk state in a time of about 0.5 seconds to 2 seconds per 100 mL of container volume 330, when a fluid at a temperature of about 80° C. to about 100° C. contacts the shrinkable film 103. For example, if the container volume is about 600 mL the shrinkable film 103 can transition from the non-shrunk state to the shrunk state in about 3 seconds to about 12 seconds when a fluid at a temperature of about 90° C. contacts the shrinkable film 103.

After forming the paperboard product, e.g., the paper cup 300, the shrinkable film 103 can optionally be shrunk at the site of manufacture to provide paperboard products having the shrinkable film 103 already shrunk. Said another way, paperboard products can be manufactured and sold or otherwise distributed with the film 103 already having been transitioned to the shrunk state.

Figure 4:
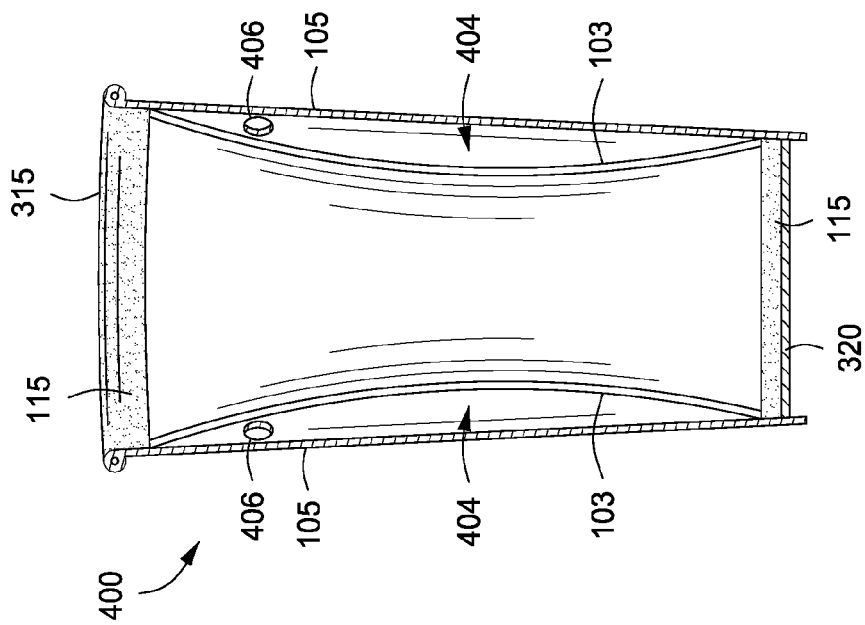
FIG. 4 depicts a partial cross-sectional, elevation view of a paper cup having a brim curl, a shrunk film, and a gap formed or located between the shrunk film and the paperboard substrate, according to one or more embodiments described.

FIG. 4 depicts a cross-sectional elevation view of a paper cup 400 having a brim curl 315, a shrunk film 103, and a gap 404 formed or located between the shrunk film 403 and the paperboard substrate 105, according to one or more embodiments. As shown in FIG. 4, the paperboard substrate 105 can include one or more vents (two are shown 406) formed or defined therethrough. The vent 406 can serve as a flow path for air or other gas to flow from a location exterior the paperboard substrate 105 and into the gap 103. While the shrinkable film 103 can shrink without the presence of one or more vents 406, the one or more vents 406 can help the shrinkable film 103 shrink. As the shrinkable film 103 shrinks, a vacuum can be formed between the paperboard substrate 105 and the shrinkable film 103. The presence of a vacuum can reduce and/or prevent the shrinkable film 103 from shrinking or fully shrinking. Having the one or more vents 406 formed through the paperboard substrate can permit air or other fluid to flow into the gap 404 as the shrinkable film 103 shrinks. As such, the formation of the one or more vents 406 through the paperboard substrate 105 can provide a plurality of paper containers, e.g., the paper cup 400, that have shrinkable films 103 that shrink in a more consistent and reliable manner. Reliable and consistent shrinkage of the shrinkable film 103 can provide a more commercially desirable product for sale to consumers.

The vent 406 can be cut through the paperboard substrate 105 using a knife, punch, pin, or other rigid apparatus capable of puncturing the paperboard substrate 105 as well as other suitable apparatuses or methods, such as a laser, for creating a vent or opening. Suitable shapes for the one or more vents 406 can include, but are not limited to, U-shaped vents, large flaps, small flaps, slits, perforations, x-shaped cut-outs, round holes, or any other shape. If two or more vents 406 are formed through the paperboard substrate 105, the shape or configuration and/or size of the two or more vents 406 can be the same or different with respect to one another.

As the shrinkable film 103 shrinks, the amount of liquid the paperboard container can hold can be reduced. As shown in FIG. 4, the gap 404 occupies a space or volume within the paper cup 400 that does not contain any liquid. For example, the container volume 330 can be reduced by about 35% or less, about 30% or less, about 25% or less, about 20% or less, about 15% or less about 10% or less, or about 5% or less with the shrinkable film 103 shrunk and the gap formed 404 as compared to the container volume 330 before the shrinkable film 103 shrinks. Accordingly, the paper cup 400 can be oversized in order to provide a paper cup 400 capable of containing a desired amount of a hot liquid.

EXAMPLES

In order to provide a better understanding of the foregoing discussion, the following non-limiting examples are offered. Although the examples may be directed to specific embodiments, they are not to be viewed as limiting the invention in any specific respect. All parts, proportions, and percentages are by weight unless otherwise indicated.

The comparative adhesive used in comparative example (C1) was a two part adhesive. The first component was poly ethyl acrylate adhesive (38-063A purchased from Henkel) and was used in an amount of 25 parts by weight. The second component, a curing agent, was diisocyanatohexane homopolymer (38-060A purchased from Henkel) and was used in an amount of 1 part by weight. The adhesive used in the first inventive example (Ex. 1) was the single part adhesive Velocity® 33-9080, a polyethylene vinyl acetate adhesive, purchased from Henkel. The adhesive used in the second inventive example (Ex. 2) was the single part adhesive Velocity®33-9192, a polyethylene vinyl acetate adhesive, purchased from Henkel.

The storage modulus (elasticity) and loss modulus of the three adhesives were measured according to the following procedure. The storage modulus and the loss modulus can be measured with a TA Instruments DMA Q800. The shear sandwich mode was chosen for the DMA tests. In this mode of deformation, two equal size pieces of the same sample were sheared between a fixed and movable plate. Modulus data were collected during the tests. The temperature was increased from 35° C. to 120° C. at a rate of 5° C./min under a frequency of 1 Hz and 3 Hz for each sample. The results are shown in Tables 1 and 2 below.

TABLE 1

| | Storage Modulus, MPa | | | | | |
|---|---|---|---|---|---|---|
| Temp., ° C. | C1 at 1 Hz | Ex. 1 at 1 Hz | Ex. 2 at 1 Hz | C1 at 3 Hz | Ex. 1 at 3 Hz | Ex. 2 at 3 Hz |
| 35 | — | — | 4.1280 | 0.6183 | — | 4.9410 |
| 40 | 0.5022 | 7.5320 | 3.9790 | 0.5958 | 4.9750 | 4.7540 |
| 45 | 0.4660 | 7.2640 | 3.8010 | 0.5591 | 4.6620 | 4.5260 |
| 50 | 0.4236 | 6.8670 | 3.5580 | 0.5135 | 4.2060 | 4.2670 |
| 55 | 0.3792 | 6.3560 | 3.2580 | 0.4604 | 3.6160 | 3.9370 |
| 60 | 0.3340 | 5.8100 | 2.9230 | 0.4059 | 2.9490 | 3.5710 |
| 65 | 0.2935 | 5.1930 | 2.5510 | 0.3566 | 2.2700 | 3.1760 |
| 70 | 0.2564 | 4.5020 | 2.166 | 0.3120 | 1.7290 | 2.7740 |
| 75 | 0.2246 | 3.7940 | 1.782 | 0.2740 | 1.2990 | 2.3530 |
| 80 | 0.2001 | 3.0020 | 1.3900 | 0.2401 | 0.9705 | 1.9410 |
| 85 | 0.1781 | 2.1910 | 1.0010 | 0.2119 | 0.7268 | 1.4830 |
| 90 | 0.1579 | 1.4670 | 0.6879 | 0.1887 | 0.5525 | 1.0630 |
| 95 | 0.1436 | 0.9619 | 0.4738 | 0.1697 | 0.4274 | 0.7339 |
| 100 | 0.1322 | 0.6456 | 0.3437 | 0.1540 | 0.3422 | 0.5167 |
| 105 | 0.1227 | 0.4576 | 0.2661 | 0.1411 | 0.2797 | 0.3837 |
| 110 | 0.1149 | 0.3487 | 0.2166 | 0.1306 | 0.2334 | 0.3023 |

As shown in Table 1, the storage modulus for the adhesives of Examples 1 and 2 were both substantially greater than the storage modulus of the comparative adhesive C1.

For example, at a temperature of 40° C. and 1 Hz the storage modulus of the Ex. 1 adhesive was about 0.7.532 MPa, which was about 1,500% greater than the comparative adhesive C1. At 40° C. and 1 Hz the storage modulus of the Ex. 2 adhesive was about 3.979 MPa, which was about 792% greater than the comparative adhesive C1. At a temperature of 100° C. and 1 Hz the storage modulus of the Ex. 1 adhesive was about 0.6456 MPa, which was about 488% greater than the comparative adhesive C1. At 100° C. and 1 Hz the storage modulus of the Ex. 2 adhesive was about 0.3437 MPa, which was about 260% greater than the comparative adhesive C1.

TABLE 2

| | | | Loss Modulus, MPa | | | |
|---|---|---|---|---|---|---|
| Temp., ° C. | C1 at 1 Hz | Ex. 1 at 1 Hz | Ex. 2 at 1 Hz | C1 at 3 Hz | Ex. 1 at 3 Hz | Ex. 2 at 3 Hz |
| 35 | — | — | 0.7662 | 0.1966 | — | 0.9963 |
| 40 | 0.1650 | 1.0070 | 0.7145 | 0.1902 | 0.8244 | 0.9037 |
| 45 | 0.1565 | 1.0040 | 0.6750 | 0.1815 | 0.8194 | 0.8179 |
| 50 | 0.1460 | 1.0140 | 0.6420 | 0.1711 | 0.8241 | 0.7499 |
| 55 | 0.1340 | 1.0430 | 0.6231 | 0.1586 | 0.8349 | 0.6974 |
| 60 | 0.1202 | 1.0740 | 0.6147 | 0.1446 | 0.8337 | 0.6671 |
| 65 | 0.1063 | 1.1040 | 0.6097 | 0.1302 | 0.7942 | 0.6526 |
| 70 | 0.0924 | 1.1240 | 0.6002 | 0.1156 | 0.7134 | 0.6462 |
| 75 | 0.07947 | 1.1250 | 0.5797 | 0.1019 | 0.6031 | 0.6377 |
| 80 | 0.0689 | 1.0900 | 0.5390 | 0.0887 | 0.4854 | 0.6231 |
| 85 | 0.0590 | 0.9739 | 0.4621 | 0.0768 | 0.3766 | 0.5817 |
| 90 | 0.0495 | 0.7696 | 0.3587 | 0.0664 | 0.2877 | 0.4982 |
| 95 | 0.0427 | 0.5476 | 0.2575 | 0.0575 | 0.2191 | 0.3850 |
| 100 | 0.0374 | 0.3668 | 0.1815 | 0.0499 | 0.1703 | 0.2792 |
| 105 | 0.03296 | 0.2432 | 0.1313 | 0.0435 | 0.1331 | 0.2000 |
| 110 | 0.0294 | 0.1676 | 0.0986 | 0.0383 | 0.1050 | 0.1470 |

As shown in Table 2, the loss modulus for the adhesives of Examples 1 and 2 were both substantially greater than the loss modulus of the comparative adhesive C1. For example, at a temperature of 40° C. and 1 Hz the loss modulus of the Ex. 1 adhesive was about 1.007 MPa, which was about 610% greater than the comparative adhesive C1. At 40° C. and 1 Hz the loss modulus of the Ex. 2 adhesive was about 0.7145 MPa, which was about 433% greater than the comparative adhesive C1. At a temperature of 100° C. and 1 Hz the loss modulus of the Ex. 1 adhesive was about 0.3668 MPa, which was about 98% greater than the comparative adhesive C1. At 100° C. and 1 Hz the loss modulus of the Ex. 2 adhesive was about 0.1815 MPa, which was about 485% greater than the comparative adhesive C1.

Peel Strength Test

The peel strength values for a comparative adhesive (C1) and two adhesives suitable for use as the adhesive in the present invention (Ex. 1 and Ex. 2) were measured. Heat shrinkable films were glued to paperboard substrates with each adhesive and the peel strength required to separate the heat shrinkable films from the paperboard substrates was measured after a time of 4 days and 147 days at a temperature of 23° C. The shrinkable film used in all examples was a 15.24 μm thick (60 gauge) Clysar® HPG heat shrinkable polyethylene film, purchased from Bemis Clysar, Oshkosh, Wis. The paperboard substrate used in all examples was P2S SBS paperboard, purchased from Georgia-Pacific Corporation. The paperboard had a basis weight of 180 lb/3,000 square feet and a thickness of 16.5 mil. The amount of adhesive used to secure the heat shrinkable film to the paperboard substrate was 3 lb/3,000 square feet. The cups were formed on a PMC 1250 cup forming machine under the same conditions, which were the standard operating conditions used to produce P1S single wall hot cups.

The peel strength required to separate the heat shrinkable film from the paperboard substrates of the examples (C1, Ex. 1, and Ex. 2) were measured according to the following procedure. The shrinkable film and the paperboard substrate was secured to one another with the adhesive and a 1 inch wide sample can be cut therefrom. An end of the shrinkable film and the corresponding end of the paperboard substrate were secured in opposing clamps and pulled apart from one another at an angle of 180° at a rate of 1 inch per minute while at a temperature of 23° C. An Instron tensile tester Model 5943 was used to measure the force with a frequency of 25 data points per second throughout the peel. The average value of the force measured was the peel strength required to separate the shrinkable film from the paperboard substrate.

The comparative example C1 and examples Ex. 1 and 2 were all corona plasma treated with a Comco press corona treater at a power output of 1.8 KW. Tables 3 and 4 show the average peel strength values for the adhesives of examples C1, Ex. 1, and Ex. 2 after an aging period of 4 days and 147 days, respectively.

TABLE 3

| | Peel Strength, Aged 4 Days | |
|---|---|---|
| Example | Average Peel Strength, g/2.54 cm at a temp. of 23° C. | Standard Deviation |
| C1 | 345.1 | 11.8 |
| Ex. 1 | 211.9 | 5.3 |
| Ex. 2 | 224.5 | 4.1 |

As shown in Table 3, the adhesives in Examples 1 and 2 provided substantially lower peel strength values as compared to the comparative example C1. For example, the average peel strength for Ex. 1 was 211.9 g/2.54 cm, which was only about 61.4% of the peel strength value provided by the comparative adhesive. Similarly, the average peel strength of Ex. 2 was 224.5 g/2.54 cm, which was only about 65% of the peel strength value provided by the comparative adhesive. However, the adhesives of Examples 1 and 2 were used to make paper cups with a brim that completely curled. In contrast, the adhesive of comparative example C1 could not make a paper cup with a completely formed brim. More particularly, the top edge of the sidewall of the paper cup made with the adhesive of the comparative example C1 did not completely curl. Visual observation was used to determine that the brims on the cups of Examples 1 and 2 did completely form while the brim on the cup of the comparative example C1 did not completely form. Being able to completely curl the brim of the paper cups of Examples 1 and 2 that were made with adhesives that provided significantly less peel strength as compared to the adhesive of the comparative adhesive C1 was surprising and unexpected.

Not wishing to be bound by theory, it is believed that the higher storage modulus of the adhesives in Examples 1 and 2 allows the adhesives to absorb more energy than the comparative adhesive C1 when the brim is formed by curling the first edge of the sidewall of the paper cup. With the comparative adhesive C1, it is believed that the energy caused by curling the brim is transferred to the interface between the film and the paperboard where it lowers the strength of the bond instead of being absorbed by the adhesive. Lowering the strength of the bond between the shrinkable film and the paperboard substrate causes the flaggers to appear where the side seam is curled into a partial brim form, which causes incomplete formation of the brim.

TABLE 4

Peel Strength, Aged 147 Days

| Example | Average Peel Strength, g/2.54 cm at a Temp. of 23° C. | Standard Deviation |
|---|---|---|
| C1 | 344 | 7.8 |
| Ex. 1 | 264 | 12.5 |
| Ex. 2 | 249.7 | 7.8 |

As shown in Table 4, the Examples 1 and 2 the peel strength values remained substantially less than the comparative example C1. As shown in Table 4, the adhesives of Examples 1 and 2 exhibited some additional curing during aging, which is due to the adhesives not including an additional curing or hardening agent.

Certain embodiments and features have been described using a set of numerical upper limits and a set of numerical lower limits. It should be appreciated that ranges from any lower limit to any upper limit are contemplated unless otherwise indicated. Certain lower limits, upper limits, and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present disclosure, other and further embodiments of the disclosure may be devised without departing from the basic scope thereof, and the scope thereof is determined by the claims that follow.

What is claimed is:

1. A blank for forming a paper product, comprising:
 a paperboard substrate comprising a perimeter and an interior region therebetween, the perimeter having a top and bottom side that are arcuate, and a right and left side that are substantially straight; and
 a shrinkable film at least partially secured to each of the top, bottom, left and right sides of the perimeter of the paperboard substrate with an adhesive disposed between the paperboard substrate and the shrinkable film, whereby a portion of the interior region of the paperboard substrate and the shrinkable film is free of the adhesive, and wherein a peel strength of less than 330 g/2.54 cm at a temperature of 23° C. is required to separate the shrinkable film from the paperboard substrate where the shrinkable film is secured to the paperboard substrate with the adhesive.

2. The blank of claim 1, wherein the shrinkable film comprises a biaxially oriented heat shrinkable polymeric material.

3. The blank of claim 1, wherein the adhesive has a storage modulus of about 1.8 MPa or more at a temperature of about 40° C. and a measurement frequency of 1 Hz.

4. The blank of claim 1, wherein the adhesive has a loss modulus of about 0.5 MPa or more at a temperature of 40° C. and a measurement frequency of 1 Hz.

5. The blank of claim 1, wherein the peel strength is less than about 300 g/2.54 cm at a temperature of about 23° C.

6. The blank of claim 1, wherein the adhesive has a storage modulus of at least 3 MPa at a temperature of 40° C. and a measurement frequency of 1 and wherein the peel strength is less than about 300 g/2.54 cm at a temperature of about 23° C.

7. The blank of claim 1, wherein the adhesive has a storage modulus of at least 3.5 MPa at a temperature of 40° C. and a measurement frequency of 1 Hz, a loss modulus of at least 0.8 MPa at a temperature of 40° C. and a measurement frequency of 1 Hz, and wherein the peel strength is less than about 290 g/2.54 cm at a temperature of about 23° C.

8. The blank of claim 1, wherein the paperboard substrate has one or more apertures formed therethrough.

9. The blank of claim 1, wherein the paperboard substrate comprises a first outer layer, a second outer layer, and an intermediate layer disposed between the first and second outer layers, and wherein the intermediate layer comprises paperboard and the first and second outer layers comprise a polyolefin.

10. The blank of claim 1, wherein the portion of the interior region of the paperboard substrate and the shrinkable film that is free of the adhesive allows the shrinkable film to move away from the paperboard substrate.

11. The blank of claim 1, wherein the adhesive is disposed as a plurality of dots.

12. The blank of claim 1, wherein the adhesive is disposed as a plurality of discontinuous lines.

13. The blank of claim 1, wherein the adhesive is disposed as a continuous line.

14. A paperboard container, comprising:
 a sidewall comprising a perimeter and an interior region therebetween, the perimeter having a top and bottom side that are arcuate, and a right and left side that are substantially straight; and
 a bottom panel secured to the bottom side of the sidewall, wherein the sidewall comprises:
  an inner surface comprising a shrinkable film;
  an outer surface comprising a paperboard substrate; and
  a brim formed by curling the top side of the sidewall, wherein the shrinkable film is at least partially secured to each of the top, bottom, left and right sides of the perimeter of the paperboard substrate with an adhesive disposed between the paperboard substrate and the shrinkable film whereby a portion of the interior region of the paperboard substrate is free of the adhesive, and wherein a peel strength of less than 330 g/2.54 cm at a temperature of 23° C. is required to separate the shrinkable film from the paperboard substrate where the shrinkable film is secured to the paperboard substrate with the adhesive.

15. The paperboard container of claim 14, wherein the shrinkable film comprises a biaxially oriented heat shrinkable polymeric material.

16. The paperboard container of claim 14, wherein the adhesive has a storage modulus of about 1.8 MPa or more at a temperature of 40° C. and a measurement frequency of 1 Hz.

17. The paperboard container of claim 14, wherein the adhesive has a loss modulus of about 0.5 MPa or more at a temperature of 40° C. and a measurement frequency of 1 Hz.

18. The paperboard container of claim 14, wherein the adhesive has a storage modulus of at least 3 MPa at a temperature of 40° C. and a measurement frequency of 1 and wherein the peel strength is less than about 300 g/2.54 cm at a temperature of about 23° C.

19. The paperboard container of claim 14, wherein the paperboard substrate has one or more apertures formed therethrough.

20. A method for making a paperboard container, comprising:

applying an adhesive about a perimeter of a paperboard substrate that comprises a perimeter and an interior region therebetween, the perimeter having a top and bottom side that are arcuate, and a right and left side that are substantially straight;

locating a shrinkable film onto the paperboard substrate to produce a blank, whereby the shrinkable film is at least partially secured to each of the top, bottom, left and right sides of the perimeter of the paperboard substrate with the adhesive disposed between the paperboard substrate and the shrinkable film, and whereby a portion of the interior region of the paperboard substrate and the shrinkable film is free of the adhesive, and wherein a peel strength of less than 330 g/2.54 cm at a temperature of 23° C. is required to separate the shrinkable film from the paperboard substrate where the shrinkable film is secured to the paperboard substrate with the adhesive;

overlapping two opposing peripheries of the blank to form a sidewall, wherein the sidewall comprises:

an inner surface comprising the film and an outer surface comprising the paperboard substrate, and a first edge adapted to be curled to form a brim curl;

securing a bottom panel to the sidewall proximate a second edge of the sidewall, the second edge opposing the first edge of the sidewall; and curling the first edge of the sidewall to form the brim curl.

21. The method of claim 20, wherein the paperboard substrate comprises one or more apertures formed therethrough and wherein the shrinkable film shrinks when contacted with a fluid at a temperature of up to about 100° C. to provide a paperboard container having a shrunk film and a gap located between at least a portion of the shrunk film and the paperboard substrate.

22. The method of claim 20, wherein the adhesive has a storage modulus of about 1.8 MPa or more at a temperature of 40° C. and a measurement frequency of 1 Hz.

23. The method of claim 20, wherein the adhesive has a storage modulus of at least 3 MPa at a temperature of 40° C. and a measurement frequency of 1 Hz, and wherein the is less than about 300 g/2.54 cm at a temperature of about 23° C.

24. The method of claim of claim 20, wherein the adhesive has a storage modulus of at least 3.5 MPa at a temperature of 40° C. and a measurement frequency of 1 Hz and a loss modulus of at least 0.8 MPa at a temperature of 40° C. and a measurement frequency of 1 Hz, and wherein the peel strength is less than about 290 g/2.54 cm at a temperature of about 23° C.

25. The method of claim 20, wherein the paperboard substrate comprises one or more apertures formed therethrough, wherein the sidewall and the bottom panel define a product volume adapted to contain a liquid, an area of the shrinkable film decreases in an amount of about 10% to about 40% when a liquid at a temperature of up to about 100° C. is introduced into the product volume.

* * * * *